UNITED STATES PATENT OFFICE.

HENRY BLUMENBERG, JR., OF LOS ANGELES, CALIFORNIA, ASSIGNOR TO CHEMICAL CONSTRUCTION COMPANY, OF LOS ANGELES, CALIFORNIA, A CORPORATION OF CALIFORNIA.

PROCESS OF EXTRACTING POTASSIUM FROM MINERALS.

1,296,458.   Specification of Letters Patent.   Patented Mar. 4, 1919.

No Drawing.   Application filed December 4, 1917.   Serial No. 205,447.

*To all whom it may concern:*

Be it known that I, HENRY BLUMENBERG, Jr., a citizen of the United States, residing at Los Angeles, in the county of Los Angeles and State of California, have invented new and useful Improvements in Processes of Extracting Potassium from Minerals, of which the following is a specification.

My invention relates to a process of extracting potassium from minerals and particularly from feldspar, and other minerals containing potassium in insoluble form.

In my United States Patent No. 1,214,003, under date of January 30th, 1917, I have described a process whereby potassium in minerals, such as feldspar, and the like, is rendered amenable by treatment with sodium nitrate. The finely ground feldspar and sodium nitrate are thoroughly mixed and subjected to heat in a closed retort until the sodium nitrate is decomposed and fuses with the feldspar while the nitric oxid fumes are driven off, thereby rendering the potassium therein amenable so that the same may be extracted by a treatment of mineral acid. The nitric acid fumes are saved by causing them to combine with calcium hydroxid, forming calcium nitrate.

I have discovered that not only the nitrates of the alkali and alkaline earth metals may be used in the extraction of potassium from feldspar and the like, but that the nitrates of lead, iron and magnesium may be used for the same purpose.

My invention consists in the steps of the process hereinafter described and claimed.

I take orthoclase, pulverized to pass through a 200 mesh screen, and lead nitrate, pulverized in the same manner, and mix the two intimately in equal proportions. The mixture is placed in a closed retort, preferably made of cast iron, and subjected to a heat of 1200° to 1500° F. until complete fusion takes place. The heating is continued until all the nitric oxids are driven off, which latter may be utilized for making nitric acid in a well known manner, or absorbed by lime to form calcium nitrate.

The reaction in the retort is approximately as follows:

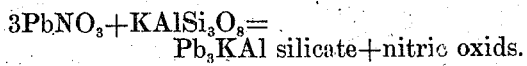

The lead of the lead nitrate will combine with the constituents of the orthoclase to form a complex lead potassium aluminum silicate, which, after pulverization, is treated with a mineral acid, such as nitric acid. Lead nitrate, potassium nitrate and aluminum silicate will be formed, which salts, after the mass has been dehydrated to render the silicate insoluble, are leached out from the mass and filtered. The potassium nitrate may be separated from the lead nitrate by the well known methods of crystallization and the lead nitrate may be used for another cycle of operation in the treatment of the next batch of orthoclase, while the potassium nitrate is an ideal fertilizer, furnishing nitrogen and potassium, both important elements for plant growth.

In place of the lead nitrate, either an nitrate or magnesium nitrate may be used, or any metal nitrate which on heating will give up nitrogen oxids.

The nitric oxid fumes may be caused to combine with lime to form calcium nitrate, as stated above, or a part of the fused mass, after being ground, may be mixed with water to form a magma through which the nitric oxids are made to pass and to combine with the lead and the potassium to form lead nitrate, potassium nitrate, aluminum nitrate, etc., which may be separated from each other as described.

I claim:

1. A process of extracting potassium salts from minerals containing potassium in an insoluble form, comprising mixing the potassium containing mineral with a metal nitrate capable of giving up its nitric acid radical when heated and other than alkali and alkaline earth metal nitrate, heating the mass until it fuses and all the nitric oxids have been expelled, treating the mass with an acid, and separating the potassium salt thus formed from the mass.

2. A process of extracting potassium salts from minerals containing potassium in an insoluble form, comprising mixing the potassium containing mineral with lead nitrate, heating the mass until it fuses and all the nitric oxids have been expelled, treating the mass with a mineral acid, and separating the potassium salt thus formed from the mass.

3. A process of extracting potassium salts from minerals containing potassium in an insoluble form, comprising mixing the mineral with a metal nitrate capable of yielding up its nitric acid radical when heated and other than alkali and alkaline earth metal nitrate, heating the mass until it fuses and all the nitric oxids have been expelled, treating the mass with nitric acid, and separating the potassium nitrate thus formed from the mass.

4. A process of extracting potassium salts from silicates containing potassium in an insoluble form, comprising mixing the silicates with a metal nitrate capable of yielding up its nitric acid radical when heated and other than alkali and alkaline earth metal nitrate, heating the mass until it fuses and all the nitric oxids have been expelled, treating the mass with a mineral acid, dehydrating the mass to render the silicates insoluble in water, and mixing water with the dehydrated mass and separating the potassium salt therefrom.

In testimony whereof I have signed my name to this specification.

HENRY BLUMENBERG, Jr.